United States Patent [19]
Beckwith

[11] Patent Number: 6,093,920
[45] Date of Patent: Jul. 25, 2000

[54] METHOD OF MICROWAVE HEATING OF FOOD

[76] Inventor: Darla L. Beckwith, 1655 Brandywine Rd., West Palm Beach, Fla. 33409

[21] Appl. No.: 09/364,909

[22] Filed: Jul. 28, 1999

Related U.S. Application Data

[60] Provisional application No. 60/128,024, Apr. 6, 1999.

[51] Int. Cl.$^7$ ........................................................ H05B 6/80
[52] U.S. Cl. .................... 219/734; 219/725; 99/DIG. 14; 426/234; 426/243
[58] Field of Search .................................. 219/734, 725; 99/DIG. 14; 426/234, 107, 243

[56] References Cited

U.S. PATENT DOCUMENTS

| | | | |
|---|---|---|---|
| 4,989,748 | 2/1991 | Parr, Jr. et al. | 219/734 |
| 5,023,134 | 6/1991 | Bezigian et al. | 428/336 |

*Primary Examiner*—Philip H. Leung
*Attorney, Agent, or Firm*—M. K. Silverman

[57] ABSTRACT

A method of microwave cooking, heating and re-heating includes the steps of placing food to be cooked, heated or re-heated into a microwave compatible container having an open mouth thereof and, thereafter, applying over said mouth of said microwave compatible container an FDA grade waxpaper having a basis weight in a range of about 15/25 to about 30/40. Thereafter, the container is placed in a microwave oven for less than a prescribed period of heating for such food type and quantity. Alternatively, such FDA grade waxpaper may be tightly wrapped or enclosed about food to be heated and thereafter placed within a microwave oven, thereby dispensing with the use of any microwave compatible container.

9 Claims, 4 Drawing Sheets

METHOD OF MICROWAVE HEATING OF FOOD

REFERENCE TO RELATED APPLICATION

This case corresponds in subject matter to that of Provisional Application No. 60/128,024, filed Apr. 6, 1999, entitled Method of Use of Waxpaper.

BACKGROUND OF THE INVENTION

The present invention relates to the use of special purpose waxpaper in microwave heating and cooking.

A longstanding problem in the area of microwave heating of foods has been that, unless the food or comestible to be microwaved is positioned within a wholly enclosed container, that is, one which typically includes a cover that may include small perforations, the food and to draw moisture out of such food cannot, as a practical matter, be heated or microwaved, this due to the fact that foods when heated within a microwave oven will, in large part, splatter out of the microwavable container and against the walls of the microwave oven so that as much of half of a given quantity of food within the microwave container will, in the absence of a suitable cover, be thrown up against the interior surfaces of the microwave oven. This phenomenon, it is believed, is due primarily to the rapid expansion of moisture within the food to be microwaved so that, during microwaving and, particularly, microwaving at high power, an evaporation of water will occur at such a rate that such splattering will result.

Alternatively, prior art usage has included the use of paper toweling and Saran Wrap to cover food, or no use of a covering. Where paper toweling is used, it will often stick to the food, while Saran Wrap will partially melt thereon and, as well, may be toxic.

The traditional response to the above problem has been to provide each microwave container with a cap or cover which, typically (but not always), will include perforations to permit escape of expanding moisture. Where perforations are not provided, a tight substantially moisture-proof cover is provided to the microwavable container to produce a "pressure cooker" effect during the microwaving process.

Quite recently, the Reynolds Aluminum Company began marketing a waxpaper purportedly suitable for use in microwave applications, that is, as a covering or enclosure for use in a microwave environment. However, testing by the within inventor of the Reynolds waxpaper has indicated that the Reynolds material is very light in weight and, typically, will blow or pull off of the microwave container soon after initiation of a microwave sequence, or will otherwise separate from the container permitting escape of steam. Accordingly, it is difficult to maintain contact between microwave waxpaper of the Reynolds type and the open mouth of the microwave container within which food has been placed. Alternatively, and in those instances where the Reynolds waxpaper does not blow off of the food container, it has been found to draw moisture thereinto causing the disintegration thereof. It is believed that, among other reasons, the Reynolds microwave waxpaper does not perform in a desirable way because such paper is too light such that, by its physical characteristics, it will absorb evaporated moisture from the food to be heated thereby causing a rapid drop in the integrity of the Reynolds waxpaper. In view of the above, the Reynolds waxpaper product is of little value in any microwave heating applications.

In the terminology of the paper industry, dry waxpaper is formed by a process in which wax is applied to a bleached parchment type paper such that most of the wax is driven into the paper, leaving little wax upon the surface thereof. Since the surface of such dry waxpaper is left substantially uncoated by wax, the porosity thereof remains significant relative to the porosity of so-called wet waxpaper which is formed by a process in which wax (typically paraffinic wax) is applied upon the surface of each sheet thereby covering or sealing the fibers thereof. In addition, the wax of dry waxpaper will not melt as readily, given the fact that the wax is substantially embedded within the fiber structure of the paper.

The present inventor has thereby discovered that the use of a cover to a microwavable container is not necessary to solve the problem of splattering and, more particularly, has discovered that certain waxpapers can serve as a convenient substitute to a cover to a microwavable container, particularly when the food to be heated is in a container of a size not having an available cover therefore. Also, it has been discovered that such use of special purpose waxpaper can bring about a superheating or steaming of microwaved food thereby accelerating the cooking or re-heating thereof. The invention thereby meets a long felt need in the such steaming of food has been demonstrated to yield a more nutritional food product as opposed to traditional microwave and other methods of cooking which act to dehydrate foods art for a more practical means of covering and heating foods in microwave applications.

SUMMARY OF THE INVENTION

The instant method constitutes a method of microwave cooking, heating, steaming and re-heating of food constituting the step of placing food to be cooked, heated or re-heated into a microwave-compatible container having an open mouth thereof, this followed by the step of applying across said open mouth an FDA grade waxpaper comprising paraffinic hydrocarbons derived from a petroleum base and having a basis weight in a range of about 15/25 to about 30/40. Thereafter, the container is placed within a microwave oven for a period of time less than the normally prescribed period for the heating of such food type and quantity.

Accordingly, the method relates to a new use of waxpaper comprising the step of positioning over the mouth of a microwavable container filled with food to be microwave-heated a sheet of waxpaper having a dimension generally related to the dimension of the microwave container and, as a second step, pressing said sheet of waxpaper onto the peripheral edges defining the mouth of the microwavable food container. Thereafter, the combination of said container and said sheet of microwave paper, with food to be microwaved positioned thereunder, is placed within the microwave oven. Upon activation of the microwave, a combination, of the physical properties of said waxpaper and the microwave frequencies imparted to the food to be heated, produce a vacuum and superheating effect within the region above said food and below said waxpaper cover to form an effective food-tight seal along the peripheral interface between said food container and said sheet of waxpaper.

It is therefore an object of the present invention to provide an efficient method of microwave cooking and re-heating which is more convenient than such methods known in the art and, and which, as well, will enhance the flavor of stale foods.

It is another object to provide a new use of certain waxpaper which, in combination with microwave frequency radiation, will create a vacuum effect internal to a chamber created by the combination of said waxpaper and a microwave container to which said sheet of waxpaper has been adhered, thereby enabling retention of vitamins, minerals, and moisture within the microwave container.

It is a further object of the invention to provide a simple and convenient method of microwave heating which eliminates the need for a microwave container cover complemental with and snap fittable onto a microwave heating dish or structure.

It is a yet further object to provide a method of the above type in which the means used as a microwave cover minimizes splatter, reduces clean-up, and is disposable.

It is a still further object to provide a non-stick medium for a microwave dish enclosure.

The above and yet other objects and advantages of the present invention will become apparent for the hereinafter set forth Brief Description of the Drawings and Detailed Description of the Invention as set forth herein.

DETAILED DESCRIPTION OF THE INVENTION

Figure 1:
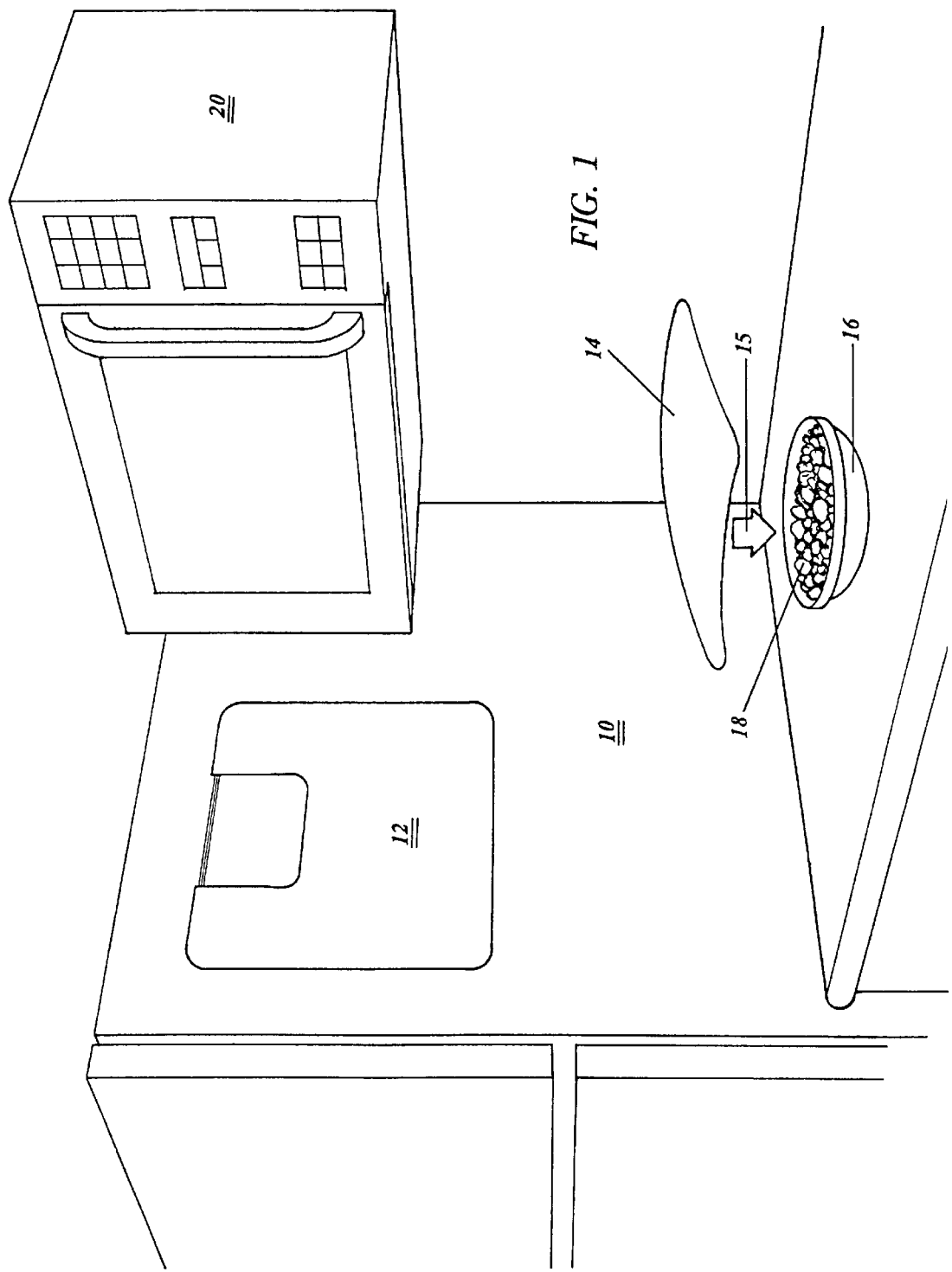
FIG. 1 is a schematic view showing the positioning of a sheet of waxpaper over a food-containing microwavable container.

With reference to the sketch of FIG. 1, there is shown a refrigerator 10 upon which maybe secured a dispenser 12 for the dispensing of sheets of waxpaper 14. Arrow 15 indicates the typical path or direction in which sheets of FDA approved so-called wet waxpaper 14 are applied to a microwavable container. Such a suitable paper has been found to be 21/33 and 15/25 wet waxpapers sold by Papercon, Atlanta, Ga., also known as IGI 1071 paper.

The FDA specifications for such waxpapers are set forth in 21 CFR 172.886 and 178.3710. Such waxpaper typically is formed of a suspension of approximately ten percent wood fibers within ninety percent water in which most of said water is absorbed by the wood fibers during a curing process. Waxpaper, in accordance with the provisions of said regulation, means petroleum coated paper that may be safely used in non-food articles in contact with food in accordance with conditions and parameters set forth in said regulations. As noted therein, petroleum wax will typically comprises a mixture of solid hydrocarbons, paraffinic in nature, which are derived from a petroleum base. The difference in definition between so-called wet and dry waxpaper is discussed in the Background of the Invention above.

Such food grade FDA-approved waxpaper is also defined in terms of its basis weight which is the weight in pounds of a ream (500 sheets) of such paper when cut to a standardized size of 24×36 inches. A base weight of paper, of the type used herein is described in terms of weight both before and after the waxing thereof has occurred. As such, the unwaxed basis weight of suitable waxpaper is typically in a range of fifteen to thirty pounds and in a range of twenty-five to forty pounds after waxation. Further, the melting point of such waxpaper, particularly wet waxpaper, is in a range of 130 to 165 degrees Fahrenheit with a mean of about 144 degrees Fahrenheit. It is, accordingly, to be understood that an integral parameter of such waxpaper for purposes of the present invention is the relatively low melting point thereof, that is, a melting point which is quickly attained at the surface of a microwavable container and, soon thereafter, by the food so microwaved (where a container is not utilized). The viscosity of the wax of such waxpaper, after melting, is 40.5.

Historically, waxpaper of such type has had no commercial application other than that of separating refrigerated or frozen slabs of meat and fish to separate such layers for purposes of shipment, freezing, or carrying by a retail customer (to be followed by placement into a freezer). It is, accordingly, to be appreciated that waxpaper of the IGI 1071 or PaperCon 21/33 type has known no use in any area outside of the butcher or refrigerated meat business, that is, as a frozen meat interlever, the cold food wrap, slip sheet therefore, tray liner in a freezing compartment of a refrigerator, a moisture barrier in such applications, and in other frozen or cold food related interleaving applications, Further, such waxpaper has historically been available only in sheets and rolls.

In the view of FIG. 1 there is also shown the positioning of a sheet of waxpaper 14 over the microwavable container 16 including therein food 18 to be microwaved. Further shown is a microwave oven 20.

Figure 2:
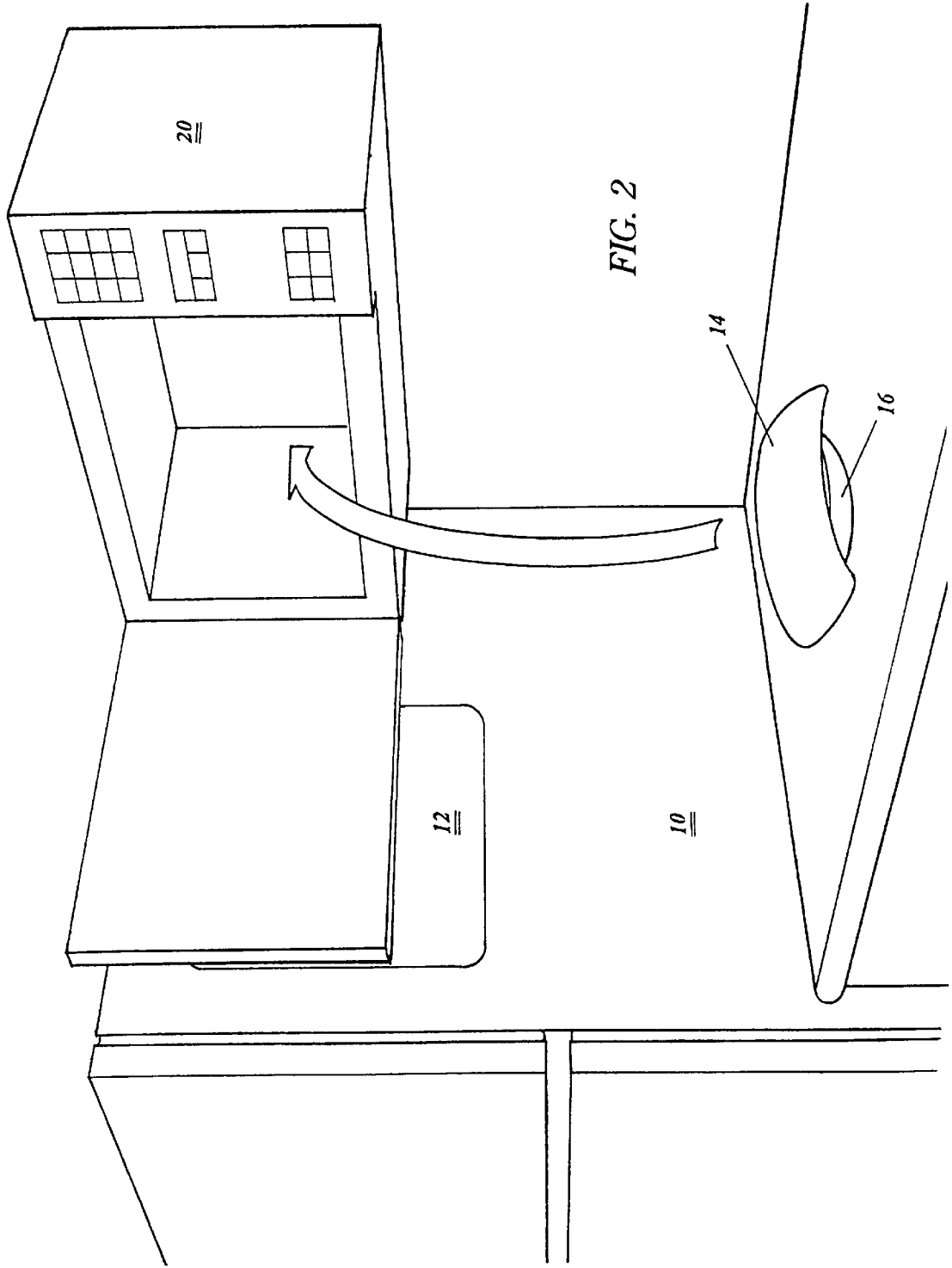
FIG. 2 is a sequential view showing the placement of a combination of said sheet of waxpaper and said container into a microwave oven.

In the sketch of FIG. 2 is shown waxpaper 14 after it has been placed over microwavable container 16 and food (not shown) contained therein. It is, thereby, to be appreciated that a sheet of waxpaper 14 will be placed over microwavable container 16 prior to its insertion into microwave oven 20.

Figure 3:
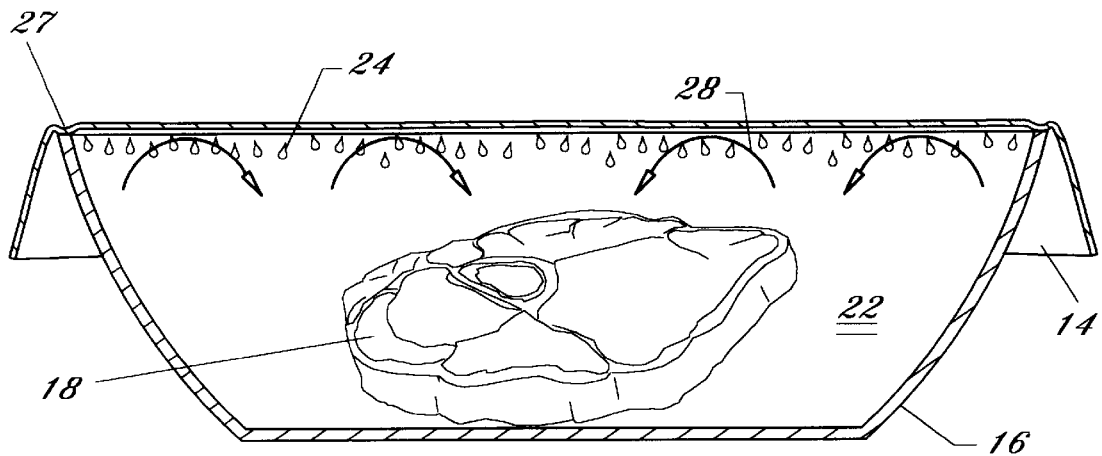
FIG. 3 is a vertical cross-sectional view showing the appearance of the combination of the microwavable dish and said sheet of waxpaper after the same has been placed into the microwave oven.

In the vertical cross-sectional diametric view of FIG. 3 is shown the combination of waxpaper 14 with microwavable container 16 after the waxpaper has been secured over food 18 and the entire system has been placed within the microwave oven 20. More particularly, in FIG. 3 is shown the effect of microwave radiation upon the food 18 to be microwaved and, therein, a vacuum effect which is created within region 22 and, as well, an accumulation of moisture 24 upon the inner surface of waxpaper 14 during the microwave process.

Figure 4:
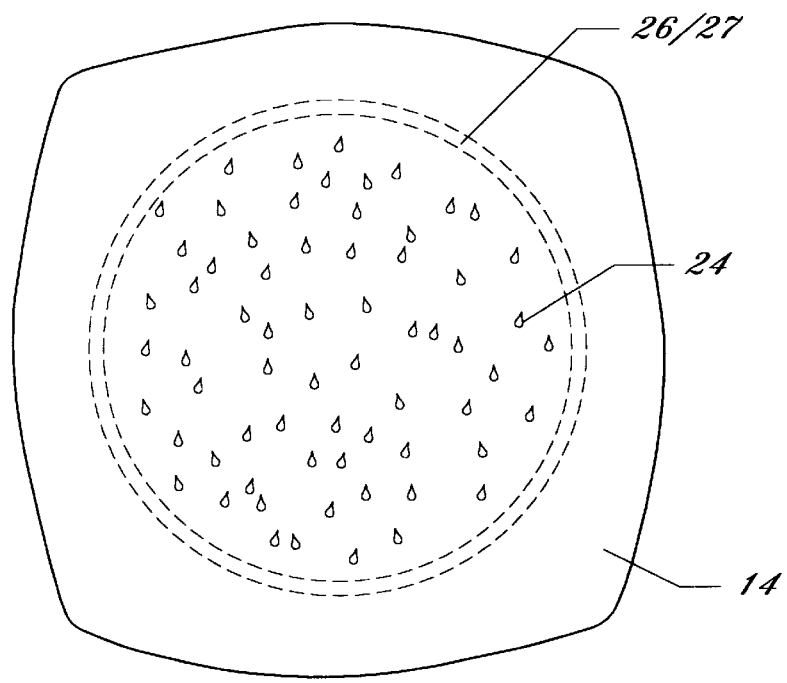
FIG. 4 is a top schematic view of the view of FIG. 3.

Shown in the top view of FIG. 4 is the manner of accumulation of moisture 24 upon the inside of sheet 14 and, as well, an annular region 26 or interface between a mouth-defining peripheral edge 28 of the microwavable container 16 (see FIG. 4). Accordingly, the interface between annular region 26 and mouth 27 of the microwavable container 16 at which occurs a seal which is a function both of the vacuum effect generated within region 22 and of the weight of accumulated moisture 24 upon the waxpaper 14. Accordingly, through the combined effect of the weight of moisture 24 and the vacuum effect within region 22, a substantial fluid-tight seal is defined at annular region 26. Even when sealing between waxpaper 14 and the mouth of container 16 does not occur, the use of waxpaper 14 has been found to nonetheless generate an accumulation of moisture, although in lesser degree.

It is to be further appreciated that, as a result of the combined effect of said sealed annular region, created by melting of wax of said waxpaper 14 at the interface with the mouth 27 of container 16 and the weight of accumulated moisture 24, the waxpaper sheet 14 is secured to container 16 with sufficient pressure so as to enable superheated moisture 28 (see FIG. 3) within container 16 to impart a superheating, that is, pressure cooker effect to the food 18 to be heated. As a result thereof, the food is cooked or re-heated within a period substantially less, typically less than half, of the normally prescribed period for a microwave heating. In addition, the supermoisture effect 28 operates to impart moisture into food 18 far in excess of moisture which would typically result in the microwaving process. Rather, the process typical in microwaving, that of evaporation of moisture from the food, is effectively reversed through the instant method.

Figure 5:
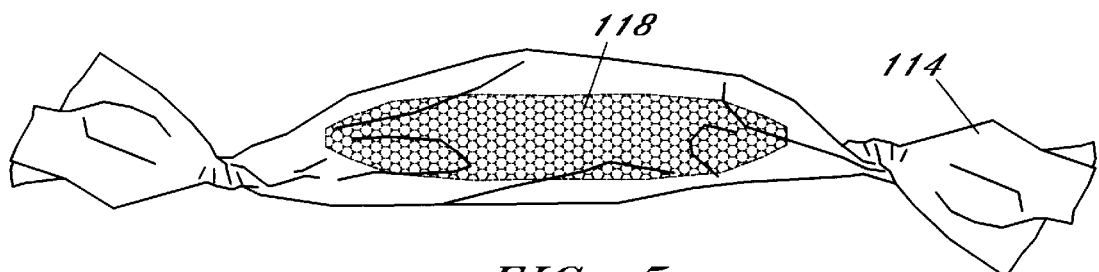
FIG. 5 is a schematic view of a further embodiment of the invention which does not require use of a microwavable container.

A further embodiment of the inventive method is shown in FIGS. 4 and 5. Therein is shown the cooking of a food product, such as corn 118 within a sheet of waxpaper 114 which has been closely wrapped or twisted at points 127 about the corn 118. Therein is shown the moisture accumulation 124 and superheating effect 128 which, as in the case of the embodiment of FIGS. 3 and 4 will, with equal effectiveness, occur in the embodiment thereof. It is, as such, to be appreciated that the instant inventive method is not reliant upon the use of a microwavable container for the practice thereof.

As another embodiment of the present invention it is to be appreciated that a removable adhesive may be provided to sheets of waxpaper 14 at annular region 26 and, in connection with types of microwave cooking which require venting of the microwavable food during cooking, perforations may be provided within a center area of the waxpaper 14. Alternatively, the provision of a removable adhesive along region 26 and at corner regions 30 may be provided to provide more reliable sealing of the corners of the waxpaper 24 along the walls and bottom of the microwavable container 16.

Figure 6:
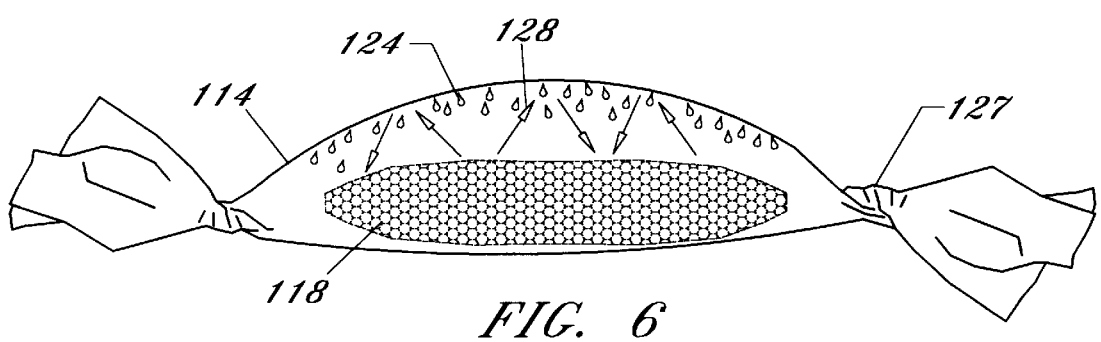
FIG. 6 is a sequential view to that of FIG. 5 showing the superheating effect internal to the waxpaper after microwaving has initiated.

Through the above set forth method described for the implementation thereof, the within inventor has discovered that waxpaper and, preferably, paraffin treated waxpaper, possesses a molecular structure which is not affected by the frequency of the microwave oven and, additionally, possesses appropriate surface properties to attract and hold moisture 24 in the manner above described with reference to FIGS. 4 and 6. That is, waxpaper has been found to be a substantial thermal insulator such that it will not incur any significant temperature during the microwaving process. It thereby can be readily held by a user of the present system without burning of the fingers or transfer of wax thereon. Therein, during the microwaving process, wax will melt primarily along annular region 26, so that removal of the waxpaper 24 after microwaving, will not be impeded and, further, so that no problem or concern need exist relative to potential contamination of the food 18 by waxpaper 14 after microwaving has occurred.

Summarizing the invention, it is to be appreciated that the particular weight of the employed wet waxpaper, as above defined, taken in combination with the weight of moisture 24 which accumulates within the microwave container 16 during the heating process, creates pressure, along annular region 26 sufficient to overcome the pressure associated with the release of moisture from the microwave food thereby creating, within internal region 22 (see FIG. 3), a high moisture, high negative pressure environment within the sealed area. The phenomenon is therefore made possible through a combination of the weight of paper and the melting point of the wax which is embedded both upon and within the substrate of the waxpaper.

Accordingly, while there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims herewith.

Having thus describe my invention what I claim as new, useful and non-obviousness and, accordingly, secure by Letters Patent of the United States is:

1. A method of microwave cooking, heating, steaming and re-heating of food, the method comprising the steps of:

(a) placing food to be heated or re-heated into or onto a microwave compatible container or plate having an open surface thereof;

(b) applying over said mouth or plate an FDA grade waxpaper comprising paraffinic hydrocarbons derived from a petroleum base and having a basis of dry-to-wet weight in a range of about 15/25 to about 30/40; and (c) placing said container or plate in a microwave oven for less than a prescribed period for food of such type or quantity.

2. The method as recited in claim 1 in which said waxpaper of said Step (b) comprises a wet waxpaper having a melting point of between about 130 degrees Fahrenheit and 165 degrees Fahrenheit.

3. The method as recited in claim 2 in which said waxpaper exhibits a basis weight after waxation in a range of about 28 to about 33 pounds per ream of 24×36 inch paper sheets.

4. The method as recited in claim 3 in which a coating used in said wet waxpaper comprises a paraffinic petroleum.

5. A method of microwave cooking, heating, steaming and re-heating of food, the method comprising the steps of:

(a) tightly wrapping or enclosing food to be cooked, heated, steamed or re-heated within an FDA grade waxpaper comprising paraffinic hydrocarbons derived from a petroleum base and having a basis of dry-to-wet weight in a range of about 15/25 to about 30/40; and (b) placing said tightly wrapped food in a microwave oven for less than a prescribed period for such food type or quantity.

6. The method as recited in claim 5 in which said waxpaper of said Step (b) comprises a wet waxpaper having a melting point of between about 130 degrees Fahrenheit and 165 degrees Fahrenheit.

7. The method as recited in claim 6 in which said waxpaper exhibits a basis weight after waxation in a range of about 28 to about 33 pounds per ream of 24×36 inch paper sheets.

8. The method as recited in claim 6 in which a coating used in said wet waxpaper comprises a paraffinic petroleum.

9. The method as recited in claim 5 in which said waxpaper exhibits a basis weight after waxation in a range of about 28 to about 33 pounds per ream of 24×36 inch paper sheets.

* * * * *